United States Patent [19]

Goto et al.

[11] Patent Number: 4,571,167
[45] Date of Patent: Feb. 18, 1986

[54] APPARATUS FOR SCORING AND COILING FISH PASTE

[75] Inventors: Shobun Goto, Shiogama; Jiro Sugihara, Miyagi; Masayoshi Yabusaki, Shiogama, all of Japan

[73] Assignee: Kabushiki Kaisha Kibun, Tokyo, Japan

[21] Appl. No.: 716,386

[22] Filed: Mar. 27, 1985

Related U.S. Application Data

[62] Division of Ser. No. 630,760, Jul. 13, 1984.

[51] Int. Cl.⁴ .......................... A01J 21/02; A21C 3/00
[52] U.S. Cl. ...................................... 425/289; 425/391
[58] Field of Search ............... 425/289, 296, 297, 319, 425/320, 322, 391

[56] References Cited

U.S. PATENT DOCUMENTS 2,170,424  8/1939  Parsons ................................. 425/322
2,905,105  9/1959  Lombi .................................. 425/322

*Primary Examiner*—Willard E. Hoag
*Attorney, Agent, or Firm*—Wegner & Bretschneider

[57] ABSTRACT

Apparatus for shaping a product of fish-paste which provides moving a fish-paste sheet having grooves on one or both surfaces thereof in its length direction, curling the sheet obliquely to the sheet-moving direction with one lateral edge of the sheet as a core to form a rolled-up article, pulling the resulting rolled-up body in a direction parallel to the sheet-moving direction around a rolling post installed outside of the opposite lateral edge line of the sheet.

4 Claims, 3 Drawing Figures

APPARATUS FOR SCORING AND COILING FISH PASTE

This application is a divisional of Ser. No. 630,760, filed July 13, 1984.

BACKGROUND OF THE INVENTION

This invention relates to a process for producing shaped marine-paste products (hereinafter referred to as "fish-paste products") and the like and to an apparatus therefor. More particularly, this invention relates to a process for rolling up a sheet-like fish-paste material into a rod-like shaped product or a roll and to an apparatus therefor.

Rod-like shaped products which are composed of assembled noodle-like fish-paste materials and colored suitably have been popular as so-called crab meat (leg)-like products or scallop muscle-like products.

As a method for producing such rod-like molded products, a process for assembling noodle-like fish paste materials into the rod-like products has been known. It is not easy, however, to form a fish-paste material into such a noodle-like materials and also to assemble or bundle the noodle-like material into the rod-like product.

In this respect, a process for producing a rod-like product without using such a noodle-like material has been proposed, which comprises forming a fish-paste product into a sheet, cutting parallel incision lines or grooves in the sheet to such a depth that the sheet is not cut off, and enrolling or rolling up the grooved sheet into a rod-like product with its axis parallel with the grooves. This process may be said to solve the above mentioned problems in that individual noodle-like shaped strands are not used, but an incised or grooved sheet easy to handle corresponding to a sheet of parallelly bonded noodle-like strands is utilized in the process.

Such conventional processes of rolling up the fish-paste sheet products, however, require a multiplicity of rollers for the rolling-up operation, whereby these processes are not always satisfactory with respect to the cost of manufacture, operation and cleaning of the apparatus.

SUMMARY OF THE INVENTION

In accordance with the present invention, there is provided a process for shaping fish-paste products which process has been improved with respect to the above mentioned points and an apparatus therefor.

The process for shaping fish-paste products from fish-paste materials according to the present invention comprises the steps of:

(1) preparing a sheet composed of a fish-paste material of specific width and indefinite length having parallel incised lines (hereinafter referred to as "grooves") cut in the lengthwise direction on at least one of the opposite surfaces of the sheet;

(2) causing the sheet to travel in its lengthwise direction by applying tension to at least its or leading or downstream end in the lengthwise direction;

(3) spirally and obliquely curling the thus traveling sheet at the front end portion thereof into a curled body having a lateral edge of the sheet as a core and extending obliquely to the sheet traveling direction and outward beyond the opposite lateral edge of the sheet;

(4) pulling the resulting curled body in a direction substantially parallel to the sheet-moving direction, the curled body being inflected at a point on or outside of the extension line of said opposite lateral edge of the sheet, at which point the curled body is supported against the force so biasing the curled body that it tends to be parallel to the sheet-moving direction due to the pulling, thereby causing the tension to be applied to the sheet and the sheet to be rolled up into a rolled-up article; and then (5) subjecting the rolled-up article to further processing.

The apparatus for shaping fish-paste products from fish-paste materials according to the present invention comprises the combination of the following means:

a pair of cooperative rolls provided with cutting blades and operating to clamp therebetween a traveling paste sheet of specific width and indefinite length and to form incision lines or grooves in the lengthwise direction of the sheet on at least one surface thereof;

conveying means for supporting the sheet emerging from between said rolls and for causing the sheet to travel in the lengthwise direction thereof, the sheet, while thus traveling, being subjected to tension applied to the leading or downstream end thereof and being spirally and obliquely curled into a curled body having a lateral edge of the sheet as a core and extending obliquely to the sheet traveling direction and outward beyond the opposite lateral edge of the sheet;

guide post means disposed with its axis perpendicular to the surface of the sheet at a position on or outside of the extension line of said opposite lateral edge and functioning to inflect the path of travel of said curled body wrappingly passed therearound from the oblique direction to a direction substantially parallel to the sheet travel direction, the curled body thereby being shaped into a rolled-up article; and tensioning means for applying a drawing force to said rolled-up article thereby to apply aforesaid tension and cause the curled body to travel around and past the guide post means.

According to the present invention, the desired roll article can be obtained by using only a single roller (more generally with a single rolling post means, as detailed below) and essentially by merely pulling the fish-paste material sheet in the operation of rolling up the sheet. Thus, the process is very simple, and the manufacture, operation, and cleaning of the shaping apparatus are also very simple.

The reason why the rolled-up article can be produced by the use of a single roller having its axis perpendicular to the surface of the sheet has not been fully clarified. It may be considered, however, that a force component contributing to rolling up of the sheet is created between the roller and the rolled-up article in contact therewith as a result of the once shaped rolled-up article being inflected in its moving direction by the roller.

DETAILED DESCRIPTION OF THE INVENTION

Shaping Method

Preparation of the grooved sheet

Figure 1:
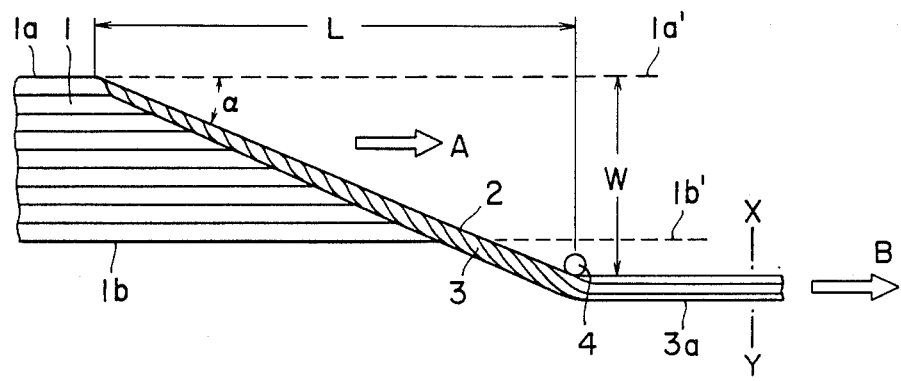
FIG. 1 is a schematic plan view indicating the principle of rolling up a fish-paste sheet in accordance with the present invention

A sheet of specific width but indefinite length composed of a marine-paste product and having grooves incised in its lengthwise direction on at least one of its opposite surfaces can be prepared by carrying out the step of forming a paste sheet of specific width and thickness and the step of incising the grooves on the front and/or back surface of the sheet in this order, or by carrying out the above two steps simultaneously.

The fish-paste sheet with the specific width and indefinite length (i.e., a belt-like product) has been known as described above. Also in the present process, the sheet with specific width can be produced by the step of extrusion through a casting die or slit die of a fish-paste material comprising ground fish meat as the main material and other optional auxiliary materials such as seasoning agents, flavoring, coloring agent, and crab meat (in the case of crab meat (leg)-like products), and the steps of roller treatment, chopping and the like. In the case of the crab meat (leg)-like products, the thickness of the sheet is ordinarily in the range of about 0.5 mm to about 4.5 mm, and the width in the range of about 40 mm to about 500 mm.

The sheet has the grooves inscribed on at least one of its two surfaces. The parallel incisions or "grooves" should be produced to such depth that the sheet is not cut off. The grooves should also be produced, in accordance with the intended shape products, at the spacing intervals similar to those of the textures of crab leg meat, scallop muscle meat, or the like. In general, the interval is substantially the same as that of the thickness of the sheet.

Such grooves can be inscribed by any suitable method. One of the preferred methods is to pass the sheet through a pair of rolls for forming grooves. Such rolls for forming the grooves have a clearance between the rolls for passage of the sheet corresponding to the cross section of the grooved sheet and are provided with a plurality of cutting blades arranged on one or both of the rolls in the circumferential direction thereof. Another method is to carry out forming of the sheet and forming of the grooves at the same time by extruding the sheet through a slit die corresponding to the cross section of the grooved sheet.

The sheet is then moved toward the rolling-up or enrolling step in accordance with the present invention. At this time, tension is applied to the sheet at least at its front or leading end in the length direction, i.e., at least at the position just before the rolling-up step. Thus, the grooved sheet to be used in the present invention should have ample strength to withstand this tension. In order for the fish-paste sheet to have this strength, it is desirable that the fish-meat protein be coagulated at least partly by heating.

In the case where the preliminary heating of the sheet is desired, the step for forming the grooves is preferably carried out by the above mentioned pair of rolls.

The grooved sheet thus prepared is then sent to the rolling-up step under tension.

Rolling-up step

The operation of rolling up or enrolling the sheet is conducted by the following steps carried out continuously.

(a) At the leading or front or downstream end of the sheet traveling under tension applied thereto, this sheet is spirally and obliquely curled into its upper surface with one lateral edge thereof as a core, the spiral curl thus formed being in a direction oblique to the direction of sheet travel and away from the lateral edge forming the core and extending at its front end beyond the opposite lateral edge thereby to form a curled body, as indicated in FIG. 1.

(b) The curled body (directed in the oblique direction) is then bent at an inflection point externally offset from the extension of the above mentioned opposite edge in a new direction approaching the sheet travel direction and is pulled in this new direction, thereby applying the above mentioned tension to the sheet and producing a rolled-up article. The curled body under the pulling force is supported at the inflection point against the force so biasing the curled body that the curled body tends to be parallel to the sheet-moving direction.

The operation of rolling-up the sheet according to the present invention will now be further described with reference to the drawing.

FIG. 1 indicates the principle of the rolling up of the sheet as viewed in plan view wherein the sheet is being moved horizontally in a steady state.

In FIG. 1, a grooved sheet 1 has a spirally curled portion 2 and the resulting curled body 3 at its front end in the direction oblique (angle $\alpha$) to the sheet traveling direction (arrow A) wherein one edge 1a of the sheet is rolled into a core. The curled body 3 is pulled around a guide post means, which in the instant example is a rolling post 4 in a direction (arrow B) approaching the sheet traveling direction (arrow A). Thus, the sheet is rolled up continuously to realize the steady state as shown in FIG. 1 by drawing the rolled-up article 3a (downstream from the rolling post 4 being designated 3a) successively. The direction B for drawing the rolled-up article 3a is normally parallel to the sheet traveling direction A as illustrated in FIG. 1. The directions B and A need not always be parallel as long as the moving and rolling-up of the sheet 1 can be carried out without trouble. Also, the directions A and B perpendicular to the surface of FIG. 1 are ordinarily parallel but are not always restricted thereto.

The position (and construction) of the rolling post 4 are of importance in the principle of this rolling-up operation. The rolling post 4 must be located at a position external of the extension line 1b' of the lateral edge 1b opposite to the other edge 1a which constitutes the core of the rolled-up article. More specifically, the position of the rolling post (more exactly, the position of its part contacting the curled body 3 as the curled sheet moves around the rolling post 4) should be nearly on the extension line 1b' of the lateral edge 1b or at a position outside of the extension line 1b' and apart from the sheet (i.e., down the line 1b' in FIG. 1). The operation of rolling-up the sheet can be conducted successfully by simply pulling the rolled-up article 3a, installing the rolling post 4 at a position as described above, and changing the direction of pulling the rolled-up article.

The rolling post 4 comprises an inflecting post means, preferably a rotary roller having an axis perpendicular to the sheet surface (i.e., direction perpendicular to the surface of FIG. 1), as detailed below.

Modification of the rolling-up steps, and treatment of the rolled-up article products The rolling-up steps as described above can be changed as necessary by addition thereto of a variety of modification or auxiliary steps. For example, although the sheet layers in the rolled-up article are bonded together and ordinarily formed into a rolled-up article without unrolling by the final heating, a bonding agent can be applied as a coating onto the sheet surface and then the coated sheet can be rolled up as necessary. For this bonding agent unheated ground fish meat having a suitable composition can be used.

The rolled-up article produced in accordance with the present invention is useful as a crab leg meat-like product. Thus, such rolled-up articles have been colored exactly like crab leg meat. As is apparent from the crab leg meat-like fish-paste products already on the market, a method for coloring the rod-like fish-paste shaped products like the crab meat is also known. Such a method can be employed also in coloring the product of the present invention.

Packaging of the present rolled-up article can be carried out according to a conventional method. One of the preferred methods for the coloring and packaging is to pack a rolled-up article with a packaging film having a coloring material to be transferred and then to cause the coloring material to be transferred onto the product by a procedure such as heating.

It is of interest in the present process that the grooves of the curled body 2 are arranged spirally around the circumference of the curled body (3) until the body reaches the rolling post 4, but the grooves become parallel to the axis of the rolled-up article (3a) after the article passes the rolling post 4 (cf. FIG. 1). Thus, the resulting rolled-up article (3a) can have the same texture as crab leg meat.

The ratio L/W of the distance L between the start point of curling of the sheet and the rolling post 4 to the distance W between the lateral edge of the start point and the rolling post 4 can be changed according to the conditions. The optimum value of the ratio L/W depends upon the thickness, width and/or hardness of the fish-paste sheet, the degree or hardness of the rolled-up article, the speed of pulling the rolled-up article, etc. The optimum value can be readily found by those skilled in the art by a simple test.

Shaping Apparatus

The apparatus for shaping the fish-paste product in accordance with the present invention comprises a combination of the following essential means A through D. One example is shown as a schematic side view in FIG. 2.

(A) A pair of rolls for forming the grooves

As described above, it is preferable that the means for forming the grooves be composed of a pair of rolls 11, 12 through which the fish-paste sheet is passed to receive the grooves.

Both of the two rolls have cutting blades in their circumferential directions because it is desired to cut the grooves on the both surfaces of the sheet.

(b) Means for moving the sheet

The means for moving the sheet which is to support the sheet coming out of the pair of rolls for forming the grooves and to cause the sheet to travel in its lengthwise direction can be any suitable means. One of such means is, for example, a belt conveyer 13 which functions to support the sheet thereon and move the sheet. Another example of such means is a roller conveyer. A belt conveyer is preferred from the viewpoint of moving the sheet stably.

(C) A rolling post means

The curled body 3 formed as described above passes in contact with a side portion of the rolling post 4. Moreover, the curled body 3 is caused to change its direction and is pulled at this contacting point. Thus, the rolling post means should have small contact resistance because the curled body is pressed against the means with a considerable amount of force toward the side of the center of movement of the sheet (i.e., upward as viewed in FIG. 1).

Thus, a preferable post means is a roller 14. Other than a roller, the post means may be a non-rotary means (specifically, a bar-like means) having a surface composed of a low-frictional material such as polyethylene or polytetrafluoroethylene. Even in the case of a roller, it is also preferable to form the surface thereof with a low-frictional material as mentioned above. The roller 14 ordinarily is of a cylindrical shape of a diameter which is constant with respect to its axial direction. The roller, however, may be of a shape wherein the diameter changes with respect to its axial direction such as a cone, a waisted drum, or a grooved roller.

Figure 2:
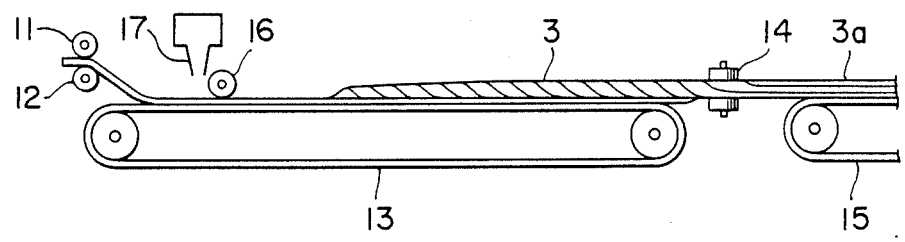
FIG. 2 is a schematic side view showing a shaping apparatus in accordance with the present invention.
Figure 3:
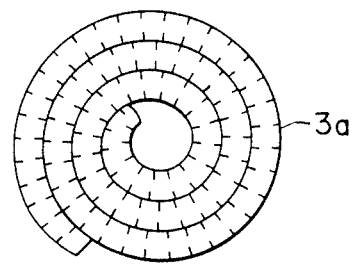
FIG. 3 is a schematic cross-section, of a plane X-Y of FIG. 1, of the rolled-up article produced.

As illustrated in FIG. 2 (and FIG. 1), the rolling post means has an axis which is substantially perpendicular to the sheet surface, but the direction is not always restricted to 90°. The rolling post means should be located at a point on or outside of the extension line $1b'$ of the lateral edge $1b$ (at a point not above the extension line $1b'$ in FIG. 1) opposite to the lateral edge $1a$ which has been curled in as the core of the curled body 3 (cf. FIG. 1). The preferable position for installing the post means is a point down the line $1b'$ in FIG. 1.

As it is clear from the above description and FIG. 1, the important portion of the rolling post means 4 is the surface thereof where the rolled-up article contacts the means under a pressing force and passes around the surface. Thus the term "a rolling post means having an axis perpendicular to the sheet surface" as used herein should be understood from this point of view and is not necessarily restricted to a bar-like means or a roller means. The term "axis" of the post means refers to the direction corresponding to the axis of a roller when the surface of the roller around which the curled sheet body is wrapped and passed in contact therewith is defined as the side surface. Thus, the rolling post means herein may be, for example, a bar having a side edge portion which has substantially the same shape as the side portion of the rod-like product. Also, in order to make the above mentioned L/W ratio optimum in given operations, the apparatus can be so designed that the position of the rolling post means is suitably adjustable.

(D) Means for pulling the rolled-up article

The means for pulling the rolled-up article in contact with the rolling post means around the inflection point in the direction (arrow B in FIG. 1) approaching the sheet traveling direction and for moving the sheet 1 in its lengthwise direction can be any suitable means. One of such means is, for example, a belt conveyer 15 which supports and moves the rolled-up article. Another example of such means is a pair of grooved rolls which rotate by holding therebetween the rolled-up article. A belt conveyer is preferred from the viewpoint of moving the rolled-up article stably.

(E) Optional devices

In additon to the above described essential means A through D, the shaping apparatus according to the present invention can be provided with a variety of means or devices. One of such additional devices is an apparatus for coloring and/or packaging the rolled-up article. As described above, such an apparatus is known in the art.

Another example of such devices is a roller 16 (and a bonding agent supply device 17) for preventing the moving sheet under tension from floating upward and/or for applying a coating of a bonding agent. See FIG. 2. It is preferable that the roller 16 have a length covering the full width of the sheet 1 on the conveyer belt 13, and that the roller 16 can press the sheet suitably so that it will not press the sheet excessively against the conveyer belt 13. The device for applying a coating of the bonding agent may be of any construction which can supply a bonding agent to the sheet surface from a slit covering the full width of the sheet.

FIG. 2 illustrates an example of a shaping apparatus and process wherein the sheet is moved in the horizontal direction, but the apparatus and process according to the present invention can be designed to move the sheet in the vertical direction or some other direction.

While this invention has been described above principally with respect to its application to shaping of paste products from marine materials, the invention is not so limited in its applicability but can find use in the shaping of a wide variety of products from sheet materials formed from paste-like materials. A few examples are other food products produced from grains, potatoes, and fruits, candies and confectioneries, and decorative articles.

What is claimed is:

1. An apparatus for shaping fish-paste products from fish paste materials, comprising, in combination:
    a pair of cooperative rolls provided with cutting blades and operating to clamp therebetween a traveling paste sheet of specific width an indefinite length and to form incision lines or grooves in the lengthwise direction of the sheet on at least one surface thereof;
    conveying means for supporting the sheet emerging from between said rolls and for causing the sheet to travel in the lengthwise direction thereof, the sheet, while thus traveling, being subjected to tension applied to the leading or downstream end thereof and being spirally and obliquely curled into a curled body having a lateral edge of the sheet as a core and extending obliquely to the sheet traveling direction and outward beyond the opposite lateral edge of the sheet;
    guide post means disposed with its axis perpendicular to the surface of the sheet at a position on or outside of the extension line of said opposite lateral edge and functioning to inflect the path of travel of said curled body wrappingly passed therearound from the oblique direction to a direction substantially parallel to the sheet travel direction, the curled body thereby being shaped into a rolled-up article; and
    tensioning means for applying a drawing force to said rolled-up article thereby to apply aforesaid tension and cause the curled body to travel around and past the guide post means.

2. The apparatus according to claim 1, in which the guide post means is a roller.

3. The apparatus according to claim 1, in which the conveying means comprises a belt conveyer.

4. The apparatus according to any of claim 1, in which the tensioning means comprises a belt conveyer to support the rolled-up article thereon.

* * * * *